Figure 4:
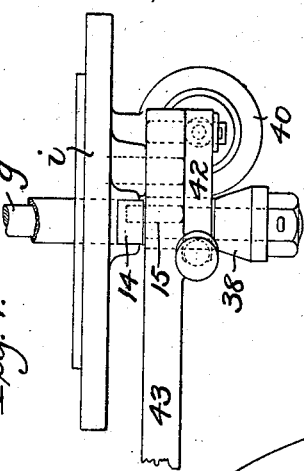

(No Model.) 3 Sheets—Sheet 1.
M. W. SEWALL.
VALVE FOR PNEUMATIC CANNON.
No. 542,174. Patented July 2, 1895.
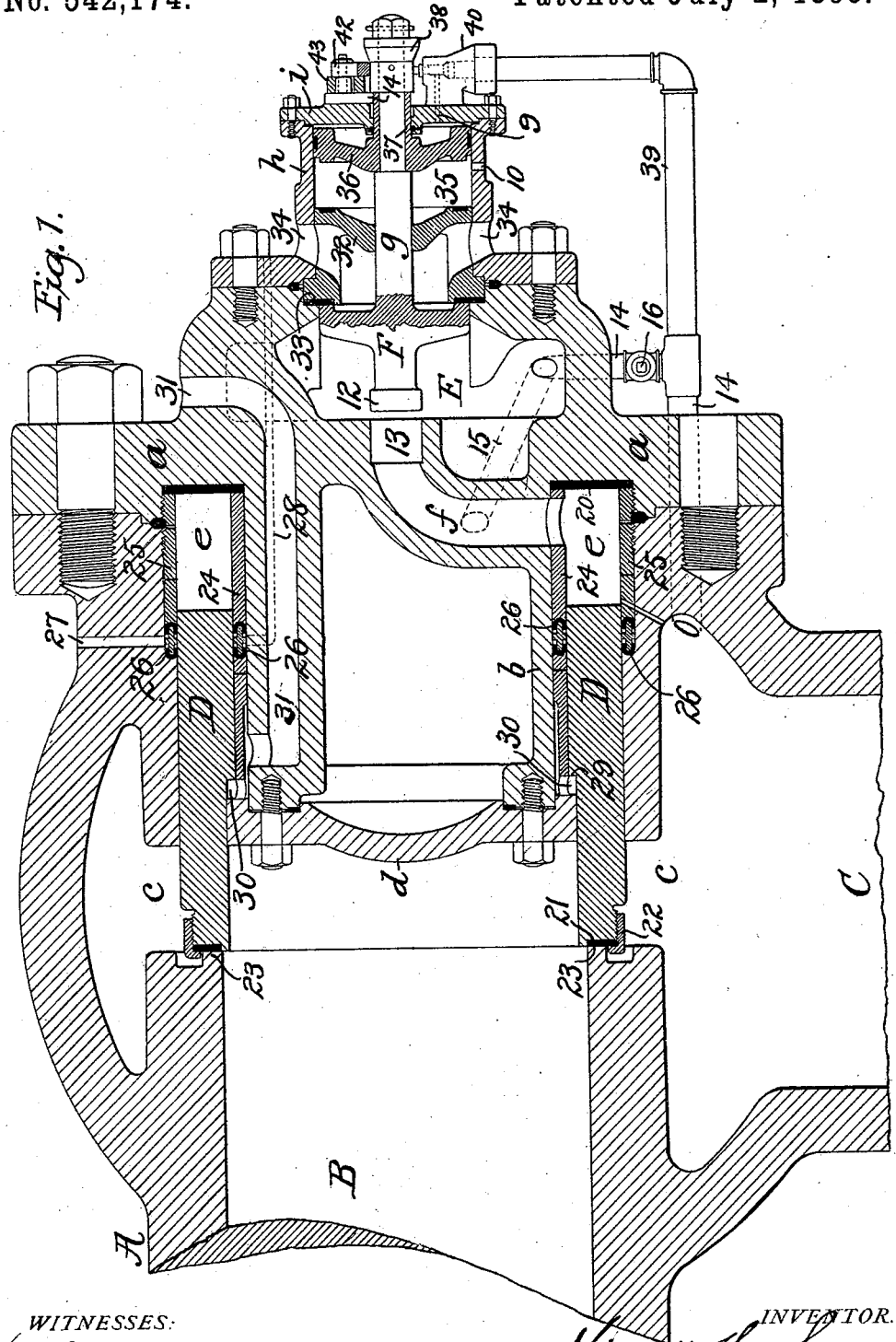
WITNESSES:
N. Marler
G. D. Beard.
INVENTOR.
Minott W. Sewall,
BY
Geo. H. Graham
ATTORNEY.

(No Model.) 3 Sheets—Sheet 2.

M. W. SEWALL.
VALVE FOR PNEUMATIC CANNON.

No. 542,174. Patented July 2, 1895.

WITNESSES:
N. Marler
J. D. Seward

INVENTOR.
Minot W. Sewall,
BY
Geo. W. Graham
ATTORNEY.

(No Model.) 3 Sheets—Sheet 3.
M. W. SEWALL.
VALVE FOR PNEUMATIC CANNON.
No. 542,174. Patented July 2, 1895.
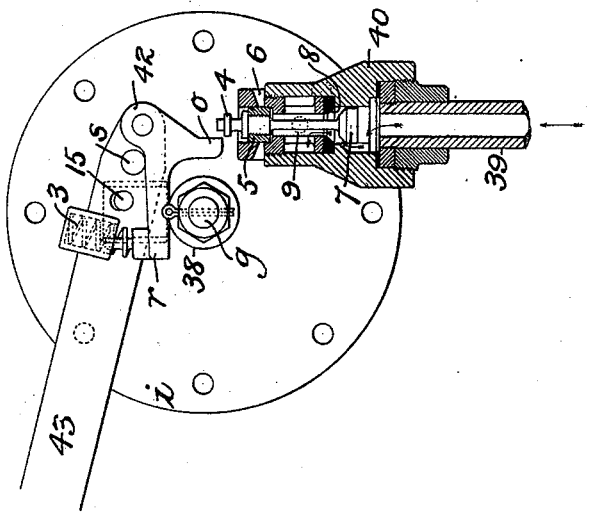
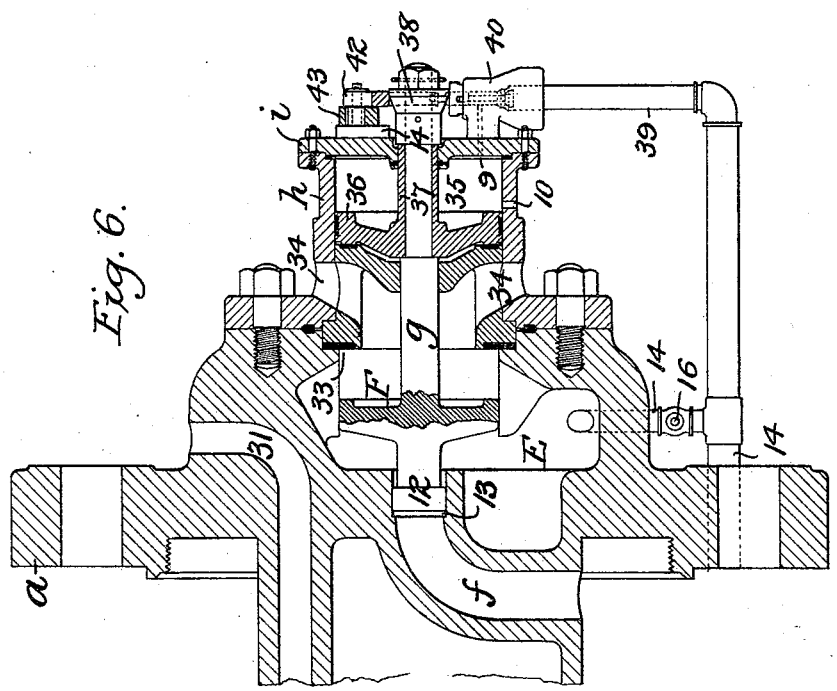
WITNESSES:
INVENTOR.
Minott W. Sewall
BY
Geo. H. Graham
ATTORNEY.

UNITED STATES PATENT OFFICE.

MINOTT W. SEWALL, OF NEW YORK, N. Y.

VALVE FOR PNEUMATIC CANNONS.

SPECIFICATION forming part of Letters Patent No. 542,174, dated July 2, 1895.

Application filed September 3, 1892. Serial No. 445,015. (No model.)

*To all whom it may concern:*

Be it known that I, MINOTT W. SEWALL, of the city, county, and State of New York, have invented certain new and useful Improvements in Valves for Pneumatic Cannon, of which the following is a specification, reference being had to the accompanying drawings, forming part thereof.

The present invention relates generally to a means of controlling automatically the opening, closing, and duration of remaining open of a main valve through the instrumentality of fluid-pressure governed in its action by the movement of an exhaust-valve and a regulator. The invention, however, more particularly relates to the means of automatically controlling the movements of the main valve of pneumatic cannon by the proper and timely action of a priming-valve and an exhaust-valve.

Heretofore in this class of valves the opening of the main valve has followed the opening of an auxiliary valve, and its closing has also followed the closing of the auxiliary valve, so that whatever errors of time and duration of opening occurred in the smaller auxiliary valve they were consequently reproduced in the larger main valve but in a much larger degree, which necessarily resulted in inaccurate firing, loss of range, and irregular loss of fluid-pressure. The chance of error, also, in valves so operating was necessarily more probable because the proper and timely firing was dependent on the correct movement of two valves as distinguished from one. The present improvements are designed to overcome these objections and to reduce to the minimum the chance of irregular and untimely movement of the main valve; to simplify the action and construction of the valves, so that accurate fitting and expensive workmanship on delicate and complicated parts are entirely obviated.

To this end the improvements are embodied in a structure that consists, essentially, of a main valve controlling the passage of the fluid-pressure into the gun that is held to its seat, closing said passage by the fluid-pressure. With the main valve there is provided an exhaust-valve chamber in communication with the fluid-pressure and with a chamber in rear of the main valve and having a seat for an exhaust-valve that controls the exhaust of the fluid-pressure from said chamber to the atmosphere. With the exhaust valve there is carried a supplemental valve or cut-off controlling the passage of the fluid-pressure from the chamber in rear of the main valve so that said pressure is confined in said chamber until the exhaust-valve has opened and then closed the exhaust to the atmosphere, thus enabling the exhaust-valve to move open and close again before the main valve can open. With the exhaust-valve, also, there is provided a piston mounted in a cylinder to which fluid-pressure may be supplied to move the piston and open the exhaust-valve, also an exhaust-passage that is opened at the proper time to allow the motive-fluid pressure to escape from the cylinder so that the exhaust-valve may return to its closed position. The supply of the motive-fluid pressure to the cylinder is controlled by a priming-valve arranged in the supply-passage, adapted to be opened by a hand-manipulation and to close automatically at some period in the opening-movement of the exhaust-valve. The valves and their exhaust and supply passages are so arranged that the opening of the priming-valve causes the opening of the exhaust-valve, during which opening movement the priming-valve is closed. The opening of the exhaust-valve prevents the escape of the pressure acting to hold the main valve closed, the exhaust-valve chamber being then exhausted of pressure; the closing of the exhaust-valve by the same pressure that holds the main valve closed; the opening of the main valve upon closing of the exhaust-valve by the escape of the pressure from the chamber behind the main valve into the exhaust-valve chamber and the action of the fluid-pressure upon the forward small area of the main valve, and finally the closing of the main valve by the rise in pressure in rear of the same, from which it will be seen that the main valve only operates after each complete operation of the exhaust-valve.

With this general understanding of the nature and function of the improvement, a detailed description of the same will now be given, reference being had to the accompanying drawings, in which—

Figure 3:
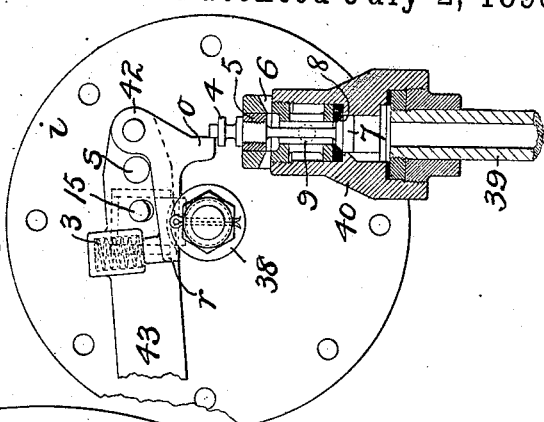
Figure 2:
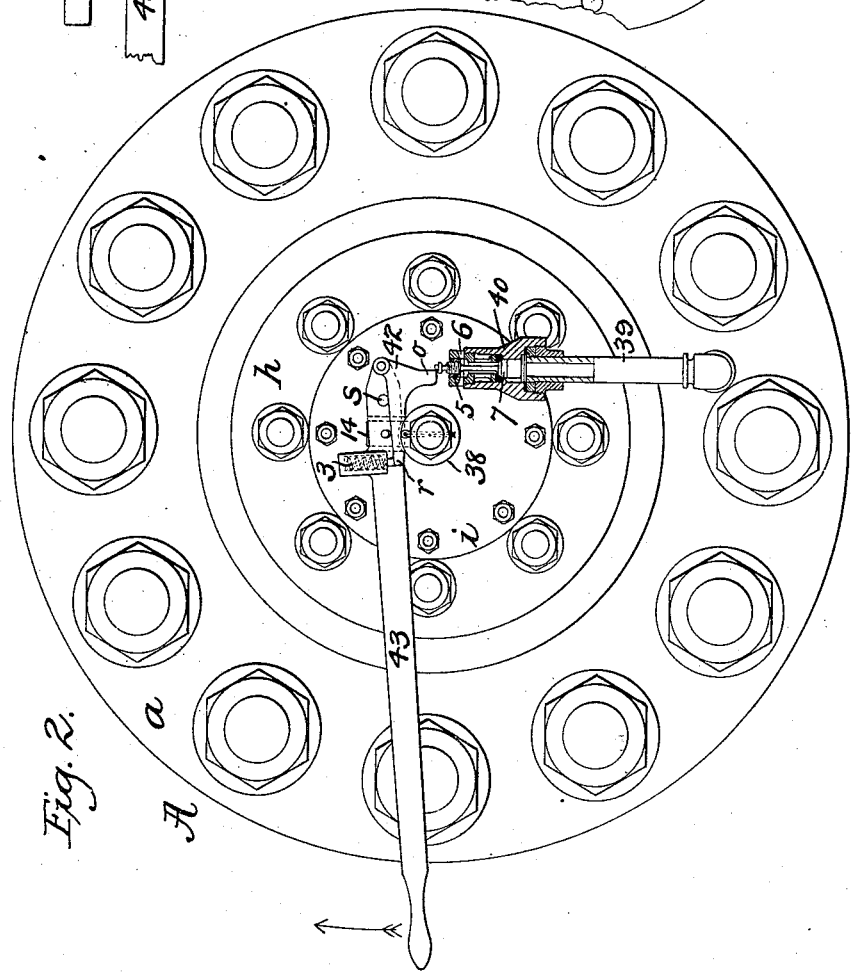

Figure 1 is a longitudinal sectional elevation of the breech end of a pneumatic cannon provided with the improvements. Fig. 2 is a rear elevation of the same, the priming-valve casing and a portion of the supply-conduit being in vertical section. Fig. 3 is an enlarged vertical section on the line 3 of Fig. 4, showing the primary valve and its ports and a portion of the tripping or starting lever in elevation. Fig. 4 is a plan view of the tripping or starting lever, priming-valve casing, exhaust-valve stem, and cylinder-head. Fig. 5 is a view similar to Fig. 3, with the priming-valve in its opened position with finger tripped ready for the closing of the valve. Fig. 6 is a sectional elevation of a portion of the parts shown in Fig. 1, showing particularly the exhaust-valve in its changed or open position.

Only so much of a pneumatic gun A is shown as will enable a proper understanding of the invention. The drawings show the breech end of such a gun, in which B is the barrel, and C the fluid-pressure supply-conduit leading from any suitable source of supply to the breech end of the gun-barrel through a continuous or other opening $c$ in the wall of the barrel, which opening is controlled by a main valve D. The breech end of the gun is closed by a head $a$, secured in position by suitable bolts, and is formed with an interiorly-projecting annular hub $b$, the inner end of which is closed by a cap $d$. The space between the exterior surface of this hub and an enlarged bore of the gun-barrel is occupied by the main valve D, the said space forming when the main valve is in its closed position a chamber $e$, for the fluid-pressure behind said main valve to hold it in said position. The rear end of the chamber is provided with a buffer 20 to receive the blow of the main valve in its opening movement, and the forward face of the main valve is provided with a suitable packing 21, held in place by a securing-ring 22, which packing seats itself against the shoulder or main valve-seat 23 of the barrel adjacent the opening $c$, and prevents any leakage of pressure into the barrel. The opposite faces of the chamber $e$, forming the guides for the main valve, are lined with suitable bushings 24, 25, each sustaining suitable packing-rings 26, which bear against the opposite surfaces of the valve and prevent the leakage of pressure from the chamber $e$ or otherwise. These packings are fed with oil under pressure through channels 27, 28.

The rear and front of the main valve are of different areas, the rear area being the larger. This difference in area forms a shoulder 29 about midway of its length, the front of which is open to the atmosphere by an annular passage 30 and channel 31, so that no pressure upon said shoulder may act to retard the closing movement of said valve.

The annular hub $b$ is hollow, and, with its cap $d$, it forms a pressure and exhaust-valve chamber E, which chamber is in communication with the rear of the main valve-chamber $e$ through a goose-neck or other connection $f$.

The exhaust-valve F is arranged at the front end of its stem $g$, which stem extends rearward through a cylindrical or other casing $h$, secured to the head $a$ of the gun, and likewise having a head $i$ at its rear end. The casing $h$ supports an interiorly-arranged and supplemental casing that provides an intermediate head 32 and an annular seat 33 for the exhaust-valve.

Between the auxiliary valve-seat 33 and the intermediate head 32 one or more openings 34 are provided to the atmosphere, so that when the exhaust-valve is moved off its seat the chamber E will be open to the atmosphere to allow the exhaust of the pressure therefrom.

In addition to the seat 33 for the exhaust-valve, the valve fits the adjacent wall of the chamber E, immediately surrounding the valve, so that the latter may have a slight lap and close exhaust before really reaching its seat.

The forward end of the exhaust-valve stem $g$ is formed with a piston-head or cut-off 12, arranged immediately in line with and adapted to enter and closely fit in a seat 13, provided at the entrance of the goose-neck $f$, to the main valve-chamber $e$. This piston-head and its seat are also so arranged that the piston-head will close and open the passage of the fluid-pressure to and from the chamber $e$ before and after the exhaust-valve F has lapped its seat to open or again close the exhaust through the passages 34. The supply of fluid-pressure to the chamber E is maintained by a conduit 14, leading from the main supply-conduit C directly to said chamber, and, if desired, this supply might be led directly to main valve-chamber $e$ through the goose-neck $f$, as indicated by the dotted lines 15 in Fig. 1. The conduit 14 may be provided with a suitable valve 16, by which the supply to the chamber E may be throttled, more or less, as desired.

The casing $h$ between the intermediate head 32 and head $i$ forms a cylinder 35, in which is mounted a piston 36, fixed to the valve-stem $g$ and adapted to reciprocate therein. The piston is formed with a sleeve 37 surrounding the stem that passes with the stem through a suitable gland in the head $i$, and rearmost end of the stem $g$ carries an inclined collar or cam 38, for a purpose to be hereinafter explained.

The rear end of the cylinder 35 is in communication by a port 9 with the fluid-pressure supply main conduit C by a conduit 39, leading from conduit 14, in which conduit 39, adjacent the head $i$, there is interposed a priming-valve casing 40, (best seen in Figs. 3 and 5,) having a seat 8 for the priming-valve 7, adapted when seated, as in Fig. 3, to shut off the admission of pressure to the cylinder 35 through the port 9.

The cylinder 35 is provided at a proper point with an exhaust-opening 10, that is arranged in rear of the piston 36 when in its normal idle position, so that upon the forward movement of the piston before reaching the limit of its stroke it will uncover said opening and permit the pressure then acting to move it to exhaust to the atmosphere.

The rear end of the cylinder 35 and the valve-casing 40 above the seat of the priming-valve 7 is open to the atmosphere through ports 6 in the head of said valve-casing, so that should any pressure prematurely leak past the priming-valve it will pass to the atmosphere without danger of moving the piston 36 and exhaust-valve F.

The stem of the priming-valve 7 carries near its upper end and just above the exhaust-ports 6 a piston or plug 5, that, as the valve is moved off its seat to allow the pressure to flow into the cylinder 35, moves down and shuts off and closes said exhaust-ports against any leaking of the fluid-pressure at that time. As soon as the priming-valve again returns to its seat 8, the piston 5 uncovers said exhaust-ports.

The end of the priming-valve stem is provided with a collar or projection 4, adapted to be engaged by one finger $o$ of a tripping-arm 42, that is pivotally connected to the short end of a starting-lever 43, which in turn is pivotally connected at $s$ to the head $i$ of the casing $h$. The other finger $r$ of the tripping-arm is borne upon by a spring 3, seated in a housing carried by the starting-lever, and the under edge of said finger $r$ is in position to overlie and bear with yielding pressure against the incline or cam 38 on the end of the exhaust-valve stem. The starting-lever 43 and its tripping-arm are so arranged that when the lever is rocked upward by hand in the direction of the arrow, Fig. 2, the short or opposite end with the tripping-arm is rocked downward so that the finger $o$ is forcibly pressed against the collar 4 of the priming-valve stem and lowers said valve from its seat 8. In this rocking movement of the lever the spring 3 permits the tripping-arm to yield with respect to the lever but constantly holds the finger $o$ to duty on the collar 4 and at the same time holding its other finger $r$ against the incline or cam 38, so that when the exhaust-valve stem and incline move forward the incline will act against said finger $r$ to rock the arm on its pivot and remove the other finger $o$ from off the priming-valve stem, and thus free the priming-valve and allow it to reseat itself.

Any premature movement of the exhaust-valve F may be prevented by providing the parts with a latch 14, that is mounted in bearings on the head $i$ in position to engage with the forward shoulder of the cam or incline 38, as shown in Fig. 1. This latch is vertically movable in its bearings and is provided with a pin 15, (see Figs. 3 and 5,) that engages with the starting-lever 43, so that when the starting-lever is moved upward to depress the priming-valve 7 the latch will be raised from in front of the shoulder of the incline 38, thereby releasing the exhaust-valve and its connected parts and permitting the pressure to operate them. The connection between the latch and the starting-lever is such that the starting-lever has a slight movement independent of the latch, and for this purpose the opening in the lever engaged by the pin 15 is somewhat elongated, as shown in Figs. 3 and 5. When the parts return to their normal positions, as in Fig. 1, the latch again engages with the shoulder of the incline 38 and locks the exhaust-valve to its seat.

With this understanding of the construction and arrangement of the improvements their operation in effecting the movements and control of the main valve will be readily understood from the following statement:

The parts being in their normal closed and idle positions, as in Figs. 1, 2, and 3, the projectile (not shown) being in position in the gun-barrel B, with its sabot just in advance of the fluid-pressure opening $c$, the gun is fired as follows: The gunner rocks the starting-lever 43 upward, as indicated in Fig. 2, so as to move the priming-valve 7 from its seat closing its exhaust-ports 6 and permitting the fluid-pressure to enter the cylinder 35 in rear of the exhaust-valve piston 36 and raising the latch 14 to release the exhaust-valve and connected parts. The fluid-pressure thereupon acting upon said piston 36 moves it, the exhaust-valve F, and piston-head 12 forward, the piston-head 12 first entering its seat 13 and closing the entrance to the main valve-chamber $e$ to confine the pressure therein and the exhaust-valve following to open the passage between the chamber E and the exhaust-passage 34, whereupon the fluid-pressure in said chamber E immediately exhausts to the atmosphere. Continuing this forward movement the piston 36 finally uncovers the exhaust port 10, so that the cylinder in rear of the piston is immediately exhausted of the pressure that is acting to move the auxiliary valve, piston, and piston-head forward, and simultaneously with this uncovering of the port 10 the incline or cam 38 on the rear end of the valve stem $g$ has moved against the finger $r$ of the tripping-arm 42 and has rocked it on its pivot sufficient to have tripped the finger $o$ from off the end of the priming-valve stem, so that said valve 7 will immediately move to its seat under the fluid-pressure behind it so as to cut off further supply of pressure to the cylinder 35. This closing movement of the priming-valve 7 has also opened the exhaust-ports 6, so that the entire pressure that may remain in the cylinder 35, ports 9, and valve-casing 40 will immediately be exhausted, so as not to impede or retard the rear or return movement of the exhaust-valve and piston. The parts are now in the position shown in Figs. 5 and 6, the exhaust of the chamber E being accomplished and the pressure held from escaping from the main valve-chamber e and goose-neck f. As soon as the pressure is exhausted in rear of the piston 36, (being of larger area than the piston-head or cut-off 12,) the pressure confined in the main valve-chamber e acts against the piston-head 12 to move the exhaust-valve F to its seat and return the connected parts to their normal position, which now takes place. In so doing the exhaust-valve F laps its seat sufficiently ahead of the piston-head, leaving its seat 13 to close the further loss of pressure and shut off the exhaust-passages 34. Immediately the piston-head 12 leaves the seat 13 and opens communication between the goose-neck and the chamber E, the pressure that had been confined in the chamber e behind the main valve exhausts into the much larger and exhausted chamber E, so that the main valve D is thereupon reciprocated rearward (by the pressure on its front end overbalancing what little remains at its rear) to open the supply-opening c and allow the fluid-pressure to flow into the gun-barrel and thus propel the projectile. The rearward momentum of the main valve will be received by the buffer 20. As soon as the exhaust-valve F has closed the exhaust-passages 34, the chamber E commences refilling with the fluid-pressure through the conduit 14, the speed of refilling being governed by the degree of throttling by the valve 16, and by the time or very shortly after the main valve has moved to its full open position the pressure is sufficient against its rear end to overcome the pressure upon its smaller front end to quickly move the main valve back to its closed position with its front end held firmly against the seat 23. The parts are then back to the position shown in Fig. 1, the gun having been once fired and ready to be again fired by another movement of the starting-lever 43 as before.

From the foregoing it will be seen that the essentials of the invention are the complete reciprocation of the exhaust-valve before the movement of the main valve, and only by such reciprocation is the main valve operative, the entire elimination of any personal equation in the movement of the priming-valve from the exhaust and main valves and the closing of the priming-valve at the proper time, and the independence of the movement of any valve for the proper and timely movement of the main valve, except as the others are preparatory to the movement thereof.

It is to be understood that while the improvements are illustrated in their preferred form, arranged at the breech end of the gun, so that the projectile must be entered into the gun-barrel either through its muzzle or by means of a swinging breech-section, as is now well known in this art, it is of course evident that the arrangement may be so modified as to permit the gun to be loaded at the breech without departing from the main features of this invention.

What is claimed is—

1. In a pneumatic cannon, a firing valve, a firing valve chamber, an exhaust valve and exhaust valve chamber, said chambers being normally connected, and means closing the connecting passage during the opening and closing movement of the exhaust valve, as set forth.

2. In pneumatic cannon, the combination with the main valve and exhaust valve, of a cut-off operated by the exhaust valve for confining the pressure to one end of the main valve during the movement of the exhaust valve, substantially as described.

3. In pneumatic cannon, the combination with the main valve and its chamber, the exhaust valve and its chamber communicating with the main valve chamber, and the exhaust passage from the latter chamber controlled by said exhaust valve, of a cut-off operated by the exhaust valve for closing the main valve chamber during the opening of the exhaust passage, substantially as set forth.

4. In pneumatic cannon, the combination, with the main valve, of the exhaust valve and cut-off carried thereby having different areas, of an exhaust passage controlled by the exhaust valve and another passage between the main and exhaust valve chambers controlled by the cut-off, substantially as set forth.

5. In pneumatic cannon, the combination with the main and exhaust valves, a chamber for each valve normally in communication, and an exhaust passage from one of said chambers, of a cut-off for closing communication of the chambers when the exhaust valve is operated to open said exhaust passage, substantially as set forth.

6. In pneumatic cannon the combination, with the main valve, an exhaust valve, and a piston against which pressure acts for causing the movement of the exhaust valve in one direction, of a cut-off for holding the pressure to one end of the main valve and against which said pressure acts for moving the exhaust valve in the opposite direction, substantially as set forth.

7. In pneumatic cannon, the combination with the main valve and its chamber, the exhaust valve chamber, and the connecting passage, of the exhaust valve having connected thereto upon one side a piston of greater area than the exhaust valve and at its opposite side a head of less area than said valve for closing the said passage and main valve chamber, substantially as set forth.

8. In pneumatic cannon, the combination with the main valve and its chamber, of an exhaust valve chamber having greater capacity than the main valve chamber, an exhaust opening from the exhaust valve chamber, an exhaust valve controlling the said opening, a passage connecting the two chambers, and a cut-off carried by the exhaust valve for closing said connecting passage substantially as set forth.

9. In pneumatic cannon, the combination with the main and exhaust valves, a fluid pressure supply passage leading to the exhaust valve chamber, a priming valve in and controlling said passage normally open to the atmosphere on one side and exposed to the fluid pressure upon the other side, and means for moving the priming valve to close the atmospheric openings and open the passage for the fluid pressure, substantially as set forth.

10. In pneumatic cannon, the combination with the priming valve casing having atmospheric ports and a passage for the fluid pressure above the valve seat, and a connection with the fluid pressure below said seat, of a valve seated in said casing having a plug for closing the atmospheric ports, and means for operating the valve to open said fluid pressure connection, and close the atmospheric ports, substantially as set forth.

11. The combination with the exhaust and priming valves, of a starting lever for said priming valve, and a latch normally engaging the exhaust valve to hold it against movement, substantially as set forth.

12. The combination with the main and priming valves, of a starting lever for the priming valve having an arm yieldingly held to duty against the priming valve stem, and a cam carried by the exhaust valve for tripping the arm, substantially as set forth.

13. The combination with the exhaust and priming valves, and a cam on the exhaust valve stem, of a starting lever carrying a tripping arm one portion of which is adapted to be encountered by said cam and the other portion of which acts against the priming valve stem.

14. The combination, with the main, exhaust and priming valves, of a cam on the exhaust valve stem, a starting lever having a tripping arm bearing against the cam and the priming valve stem, and a latch mounted on the exhaust valve casing and normally holding the exhaust valve against movement, and connections between the starting lever and said latch for operating the latter, substantially as set forth.

In witness whereof I have hereunto set my hand, this 6th day of July, 1892, in presence of two witnesses.

MINOTT W. SEWALL.

Witnesses:
D. B. PRESTON,
A. I. KLAR.